United States Patent
Wilson et al.

(10) Patent No.: US 7,555,444 B1
(45) Date of Patent: Jun. 30, 2009

(54) DYNAMIC TIME-OF-PURCHASING-DECISION INCENTIVE SYSTEM AND METHOD

(75) Inventors: James Dennis Wilson, Akron, OH (US); Kristin Knauer Wilson, Akron, OH (US)

(73) Assignee: James D. Wilson, Akron, OH (US)

( * ) Notice: Subject to any disclaimer, the term of this patent is extended or adjusted under 35 U.S.C. 154(b) by 1215 days.

(21) Appl. No.: 10/071,537

(22) Filed: Feb. 5, 2002

Related U.S. Application Data

(60) Provisional application No. 60/268,199, filed on Feb. 12, 2001.

(51) Int. Cl.
G06Q 30/00 (2006.01)
(52) U.S. Cl. .......................................... 705/14
(58) Field of Classification Search .................. 705/14
See application file for complete search history.

(56) References Cited

U.S. PATENT DOCUMENTS

| | | | |
|---|---|---|---|
| 4,972,504 A | | 11/1990 | Daniel, Jr. et al. |
| 5,083,765 A | | 1/1992 | Kringel |
| 5,107,100 A | | 4/1992 | Shepard et al. |
| 5,149,950 A | | 9/1992 | Swartz et al. |
| 5,250,789 A | * | 10/1993 | Johnsen ..................... 705/14 |
| 5,368,129 A | | 11/1994 | Von Kohorn |
| 5,420,606 A | | 5/1995 | Begum et al. |
| 5,710,886 A | * | 1/1998 | Christensen et al. .......... 705/14 |
| 5,789,732 A | | 8/1998 | McMahon et al. |
| 5,918,211 A | * | 6/1999 | Sloane ....................... 705/16 |
| 6,076,069 A | | 6/2000 | Laor |
| 6,082,620 A | | 7/2000 | Bone |

(Continued)

OTHER PUBLICATIONS

"CoolSavings(R) Selects Geoworks' Mobile ASP(TM) Solution to Deliver Wireless Promotional Messages". PR Newswire. Oct. 18, 2000.*

(Continued)

*Primary Examiner*—Eric W. Stamber
*Assistant Examiner*—Michael Bekerman

(57) ABSTRACT

A system and method that provides suppliers or sellers with a competitive opportunity to influence consumers at the precise moment a purchasing decision is being made. A consumer using a personal wireless device (110), which has an integrated bar code scanner (120), scans the bar code of a product in a store. The device, using wireless communication (420), sends the scanned product information and a consumer ID to a processing application (430). The processing application (430) sends a profile of the consumer's past shopping behavior, the scanned product information and other data to each interested supplier's competitive incentive offer engine (470). Each supplier's incentive engine determines the optimal incentive to offer and returns this data to the processing application (430) where the incentives are collectively sent back to the consumer's device (110) using wireless communication (421). The device displays the competing incentives and the consumer selects one or more of the incentives presented and repeats this process throughout the store. Upon checkout, a bar code identifying the store and point of sale register is scanned and the incentives are redeemed by scanning them into the store's point of sale register like conventional printed coupons via a display (240) on the device that dynamically renders standard coupon bar codes. The redeemed incentives are then sent from the device to the processing application using wireless communication (422) where they are reconciled and the store is given credit for the redeemed values.

15 Claims, 15 Drawing Sheets

U.S. PATENT DOCUMENTS

| | | | |
|---|---|---|---|
| 6,134,548 A | 10/2000 | Gottsman et al. | |
| 6,173,891 B1 | 1/2001 | Powell | |
| 6,237,145 B1 | 5/2001 | Narasimhan et al. | |
| 6,260,758 B1 | 7/2001 | Blumberg | |
| 6,282,516 B1 | 8/2001 | Giuliani | |
| 6,292,786 B1 | 9/2001 | Deaton et al. | |
| 6,311,896 B1 | 11/2001 | Mulla et al. | |
| 6,314,406 B1 * | 11/2001 | O'Hagan et al. | 705/14 |
| 6,321,210 B1 | 11/2001 | O'Brian et al. | |
| 6,327,570 B1 * | 12/2001 | Stevens | 705/7 |
| 6,327,574 B1 | 12/2001 | Kramer et al. | |
| 6,334,108 B1 | 12/2001 | Deaton et al. | |
| 6,434,530 B1 * | 8/2002 | Sloane et al. | 705/1 |
| 6,587,835 B1 * | 7/2003 | Treyz et al. | 705/14 |
| 6,862,575 B1 * | 3/2005 | Anttila et al. | 705/14 |
| 2002/0002504 A1 * | 1/2002 | Engel et al. | 705/26 |

OTHER PUBLICATIONS

Symbol Portable Shopping System™ (Product Literature) www.symbol.com/products/consumer-systems/consumer-portable-shopping-sys.html, Printed Jan. 20, 2002.

* cited by examiner

DYNAMIC TIME-OF-PURCHASING-DECISION INCENTIVE SYSTEM AND METHOD

RELATED APPLICATION

This application is entitled to the benefit of the Provisional Patent Application Ser. No. 60/268,199 filed Feb. 12, 2001.

FIELD OF INVENTION

The present invention relates to a dynamic time-of-purchasing-decision incentive system and method, and more particularly, to a wireless system and method whereby one or more customized incentives are communicated to a shopper at the precise moment in time when the purchasing decision is being made.

DESCRIPTION OF PRIOR ART

Price is often a significant motivating factor in purchasing decisions. Therefore, product suppliers, such as manufacturers and retailers, frequently resort to the mass distribution of printed discount coupons in an effort to entice shoppers to consider purchasing their products. In most instances, such coupons are printed on paper and are distributed to shoppers sometimes together with discount coupons for other products in mass mailings or as inserts/advertisements in newspapers and other printed matter. Discount coupons are also sometimes printed on the packaging of consumer goods, and thus are sometimes affixed to materials other than paper such as paperboard, plastics, and metal foils. Most printed discount coupons bear a specified monetary value and an expiration date. Most printed discount coupons also bear a Universal Product Code (UPC) bar code that allows retail Point of Sale (POS) systems, such as, for example, laser checkout scanners, to easily recognize and record them. There are some significant disadvantages to the existing process that the prior art has not been able to successfully overcome.

The costs incurred by suppliers to print and distribute discount coupons are substantial. Individualized mailings that are designed to distribute printed discount coupons only to shoppers in specific demographics who are likely to purchase the suppliers' goods can be very expensive, and prohibitively so for some types of goods. Accordingly, suppliers often resort to the mass distribution of discount coupons. This distribution method is far less expensive than individualized mailings on a per coupon basis, but it results in a large amount of waste. Typically, only a small percentage of mass distributed printed discount coupons are actually redeemed by recipients at least in part because mass mailings are, by definition, not specifically tailored to reach only shoppers in specific demographics.

Another reason for the waste associated with printed discount coupons is that some shoppers are simply not willing to expend the effort necessary to collect, collate, manage, and redeem printed discount coupons. Although most, if not all, shoppers like to receive price discounts on the products they purchase, some are simply not willing to search for, collect, and collate discount coupons and then carry them throughout the seller's premises in an effort to use them. Other shoppers find the collection and use of printed discount coupons to be embarrassing.

From the perspective of sellers, printed discount coupons also present many problems. The physical management of printed discount coupons redeemed by shoppers is difficult at least in part because discount coupons are often of differing sizes and are printed on a variety of materials such as paper, paperboard, plastic, and foil. Moreover, some shoppers simply tear the discount coupons out of printed advertisements leaving ragged or jagged edges, which makes them difficult to sort and physically process. Sellers must collect these odd shaped printed discount coupons, separate them by supplier, reconcile them, and in some cases seek reimbursement from the product supplier or other party. This process is tedious, expensive, time consuming, and prone to error. Accordingly, sellers frequently employ special coupon clearinghouses for this purpose, which adds to the cost.

From the perspective of suppliers, discount coupons also present certain problems. For example, suppliers must handle large volumes of discount coupons received from a large number of different sellers in order to verify that the amount of reimbursement sought by them is accurate. This problem can be compounded if the supplier has issued discount coupons relating to a variety of different goods. In addition, suppliers frequently have a difficult time estimating the percentage of printed discount coupons that will ultimately be redeemed by recipients and are often required to purchase insurance to cover excessive redemption costs in the event that a coupon is being redeemed at an unexpectedly high rate. Thus, it is difficult for suppliers to accurately gauge how many discount coupons to distribute, and how much of a discount to offer.

In recent years, there have been several attempts to address some of the problems associated with the distribution and redemption of printed discount coupons. For example, some suppliers, sellers and third parties have attempted to use the Internet to distribute their discount coupons to shoppers, who presumably will print the coupons on paper using a printer and then redeem them at a participating seller's place of business. Widespread acceptance of these Internet-based distribution channels has not yet been accomplished. Moreover, Internet-based coupon distribution systems still present the same problems discussed above pertaining to the physical management of redeemed printed coupons.

Another method that attempted to address some of the problems of printed discount coupons, as exemplarily described in U.S. Pat. No. 6,173,891 of Powell, et al. issued Jan. 16, 2001, titled "Retail store configured for bi-directional communication between a plurality of product shelf areas and a plurality of portable cards" hereby incorporated herein by reference, involves the use of electronic cards that record coupon information from special stations placed near retail product displays in retail stores. The obvious shortcoming of this method is that large volumes of special hardware must be installed throughout the store (i.e., one for each product for which an incentive is being offered) in order for the method to be employed. The need for large volumes of hardware and installation imposes a significant cost to the seller and/or supplier.

Another method, as exemplarily described in U.S. Pat. No. 5,918,211 of Sloane issued Jun. 29, 1999, titled "Method and apparatus for promoting products and influencing consumer purchasing decisions at the point-of-purchase" hereby incorporated herein by reference, describes a system that uses a store provided hand-held wireless device with an integrated bar code scanner that will facilitate consumer directed checkout and offer targeted incentives and promotions to shoppers. Being store provided devices, these systems typically require a device distribution vending machine or similar apparatus to house and deploy the devices within a store. This type of approach requires substantial floor space and introduces a significant cost to the store to install and integrate into their existing POS systems. With this type of system the stores must incur the cost to maintain and manage the hand-held wireless devices in the event they are broken, lost or stolen. Additionally, there is the added complexity of having to replicate massive databases to each in-store system with product data and a static set of available incentives.

Another method, as exemplarily described in U.S. Pat. No. 6,321,210 of O'Brien, et al. issued Nov. 20, 2001, titled "Method and apparatus for selective distribution of discount coupons" hereby incorporated herein by reference, describes a system for printing discount coupons at the point of sale register after a consumer's transaction has been completed. These systems typically operate by determining incentives based upon the products purchased by and/or the consumers prior purchasing history (using a "preferred shopper card") and then issuing printed discount coupons to the consumer at the point of sale terminal after the sale in an effort to influence the consumer's future purchases. Again, one of the downfalls of this type of system is that it still involves the use of printed discount coupons, which must be physically managed when redeemed. Moreover, such discount coupons are delivered to the consumer after the consumer has made an initial purchasing decision. Thus, this approach does not provide an active way for suppliers or other interested parties to influence the buying decisions of consumers at the very moment they are contemplating a purchase.

In view of the foregoing, a system and method is needed that can dynamically provide customized incentives to shoppers at the time purchasing decisions are being made that does not suffer from the limitations and drawbacks of the prior art. Preferably, the system and method should be convenient and easy for consumers to use, operate with existing technologies, and alleviate problems presently encountered by consumers, sellers, and suppliers.

SUMMARY OF THE INVENTION

The present invention provides a system and method that provides suppliers with a competitive opportunity to influence shoppers at the precise moment a purchasing decision is being made. A shopper using a Personal Wireless Device (PWD), which has an integrated bar code scanner, scans the bar code of a product in a store. The PWD, using wireless communication, sends the scanned product information and the shopper's ID to a processing application. The processing application sends a profile of the shopper's past shopping behavior, the scanned product information, and other data to a number of interested suppliers' competitive incentive offer engines. Each supplier's incentive engine determines the optimal incentive to offer to the shopper and returns this data to the processing application where the incentives are collectively sent back to the shopper's PWD using wireless communication. The PWD displays the competing incentives and the shopper selects one or more of the incentives presented and then repeats this process throughout the store. Upon checkout, a bar code identifying the store and point of sale register is scanned and the incentives are redeemed by scanning them into the store's point of sale register like conventional printed coupons via a display on the PWD that dynamically renders coupon bar codes. The redeemed incentives are then sent from the PWD to the processing application using wireless communication. The processing application reconciles the incentives and the store is given credit for the redeemed values.

In other embodiments of the invention, the PWD of the system and method according to the present invention supports added motivational and/or purchase influencing functionality such as shopping lists, gift registries, nutrition information, event reminders, tracking of expenditures and savings totals, and other shopping metrics.

The foregoing and other features of the invention are hereinafter more fully described and particularly pointed out in the following description, which describes certain illustrative embodiments of the invention. These illustrative embodiments are merely indicative, however, of but a few of the various ways in which the principles of the present invention may be employed. Accordingly, specific structural and functional details disclosed herein are not to be interpreted as limiting, but merely as representative for teaching one skilled in the art to variously employ the present invention in virtually any appropriately detailed structure.

To paraphrase, the present invention is a system for providing incentives for products with bar codes to a shopper at the time a purchase decision is being made. The system is comprised of a PWD with an integrated bar code scanner that the shopper can use to scan bar codes on products; a processing application containing Consumer Influence Profiles (CIP) and other stored data; a wireless means of communicating between the PWD and the processing application; a plurality of supplier competitive incentive offer engines each having a means for determining an incentive based on data received from the processing application; the processing application having a means of communicating data relating to determining an incentive to the supplier competitive incentive offer engines; each of the plurality of competitive incentive offer engines having a means for communicating incentives to the processing application; the processing application having a wireless means for communicating the incentives to the PWD; the PWD having a user interface usable by the shopper to select the incentives to be redeemed; the PWD having a means for communicating the redeemed incentives to a point of sale system; and the PWD having a means for communicating said redeemed incentives to said processing application.

To further paraphrase, the present invention includes a method for providing incentives for products with bar codes to a shopper at the time a purchase decision is being made. The method begins with providing a PWD having a scanning means usable by the shopper; reading the bar code by the PWD; providing a processing application having stored data relating to a CIP for the shopper; communicating the bar code and shopper information to the processing application from the PWD; evaluating the bar code and shopper information to determine the CIP by the processing application; providing a plurality of competitive incentive offer engines each having a means of determining an incentive based on the provided CIP; communicating the CIP to the competitive incentive offer engines from the processing application; determining an incentive for the shopper based on the CIP by each of the competitive incentive offer engines; communicating the incentives back to the processing application from the competitive incentive offer engines; communicating the incentives to the PWD from the processing application; selecting the incentives to be redeemed by the shopper; communicating the incentives to be redeemed to a point of sale system from the PWD; and communicating the redeemed incentives back to the processing application from the PWD.

Accordingly, the system and method according to the present invention provide many objects, advantages and improvements over the prior art. Unlike the inefficiencies and waste associated with printing and distributing paper coupons, this system will afford far more efficient, effective and targeted incentives. Combining the real-time knowledge of what a shopper is contemplating buying (that being the product scanned) and the immediacy of the electronic delivery of the incentive allows every incentive to be truly relevant and targeted to each shopper. Additionally, the CIP that is provided enables the supplier to generate a targeted offer designed to maximize the effect of the incentive for the lowest possible cost. Issuing incentives at the moment the purchase decision is being made also improves on the current process of printing coupons for the shopper at the POS system, which provide incentives long after the purchase decisions have been made.

The present invention also alleviates the problems for consumers not willing to search for, collect, and collate discount coupons. Triggered by a shopper scanning a product, every coupon is generated in real time and then presented to the shopper electronically within seconds. Every time they go shopping they will receive new coupons as they demonstrate a need for them. Consumers who may find the collection and use of printed discount coupons to be embarrassing will very possibly find the present invention interesting and fun to use. Some consumers will find using the bar code scanner in the sophisticated wireless device entertaining in and of itself. Others will be attracted to the element of surprise and reward when receiving real-time discounts each time they scan a product. And since incentives are issued at the moment a shopper scans a product, shoppers will no longer be frustrated by making a purchasing decision based in part on a discount coupon only to discover upon checkout that the discount coupon has expired.

Stores will no longer need to face the challenges associated with the physical management of redeemed printed discount coupons of differing sizes or materials because the incentives generated are electronic in nature. The redemption and reconciliation process is completed without physical coupons but rather through the wireless transmission of data. Reimbursement from the product supplier or other parties will also be accomplished electronically thereby minimizing errors and allowing funds from redeemed incentives to be processed and deposited in the store's accounts more rapidly thereby improving cash flow for the store. The elimination of the traditional physical coupon, in all of its varieties, also eliminates the expenses associated with coupon clearinghouses and their services.

Each redeemed inventive is recorded in a database and enables the linking of a specific user, store, POS register, date and time of purchase together. This data chain allows most critical aspects of the transaction to be audited thereby enabling suppliers to detect fraudulent incentive redemption and reduce the costs related to this type of fraud. With the present invention, suppliers would also have the ultimate real-time control of the incentives being offered and near immediate feedback regarding their effectiveness. The incentives have a limited lifetime measured in hours instead of days or months, so current over-redemption problems frequently associated with traditional coupons are completely negated. This precise degree of control removes the risks associated with estimating the total redemption for printed coupons and eliminates costly coupon-redemption insurance frequently purchased by suppliers to offset their risks.

The present invention further addresses the problems presented to the store in prior art references. Many prior art and patented solutions require that stores purchase expensive hardware or install apparatus that takes up valuable floor space. These existing systems often require costly integration with store's POS system and may require additional technical staff to maintain it. In the preferred embodiment, the present invention only requires that a small bar code sticker be placed on or near each POS system in the store. The preferred embodiment of the present invention requires no additional store-based hardware, uses no additional floor space, integrates seamlessly with existing POS systems common in the industry, and incurs no additional maintenance costs for the store.

BRIEF DESCRIPTION OF THE DRAWINGS

The foregoing and other features of the present invention will become apparent to those skilled in the art to which the present invention relates upon reading the following description with reference to the accompanying drawings, wherein.

REFERENCE NUMERALS IN DRAWINGS

| | | | |
|---|---|---|---|
| 110 | personal wireless device | 120 | bar code reader |
| 130 | button | 140 | display |
| 150 | power switch | 160 | infrared transceiver |
| 210 | personal wireless device | 240 | dynamic bar code display |
| 250 | back face of personal wireless device | 310 | personal wireless device controller |
| 311 | battery | 312 | cellular transceiver |
| 313 | RF transceiver | 314 | bar code display controller |
| 315 | user interface display controller | 316 | bar code reader controller |
| 317 | user interface switch | 318 | microcontroller |

-continued

| | | | |
|---|---|---|---|
| 319 | random access memory | 320 | flash memory |
| 321 | GPS controller | 322 | power switch |
| 323 | infrared controller | 410 | personal wireless device |
| 420 | wireless communications interface | 421 | wireless communications interface |
| 422 | wireless communications interface | 430 | processing application |
| 440 | data processor | 450 | database |
| 460 | communication interface | 461 | communication interface |
| 470 | competitive incentive offer engine | 480 | Point of Sale System |
| 490 | bar code communications interface | 491 | wireless communications interface |
| 492 | wireless communications interface | | |

DESCRIPTION

FIGS. 1a, 3a, 4a, 4b—Preferred Embodiment

Figure 1A:
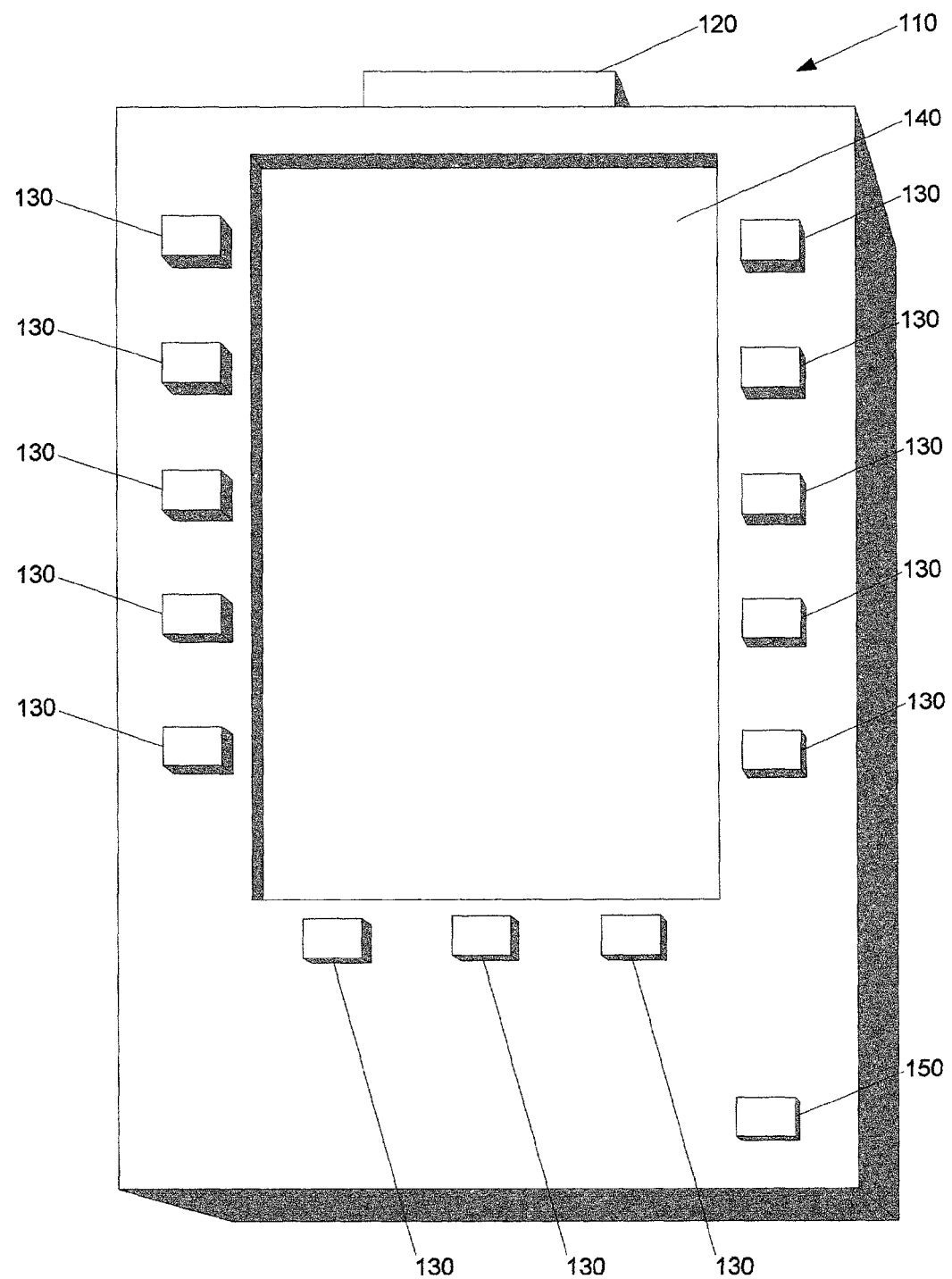
FIG. 1a is a perspective view of a personal wireless device according to the invention.
Figure 3A:
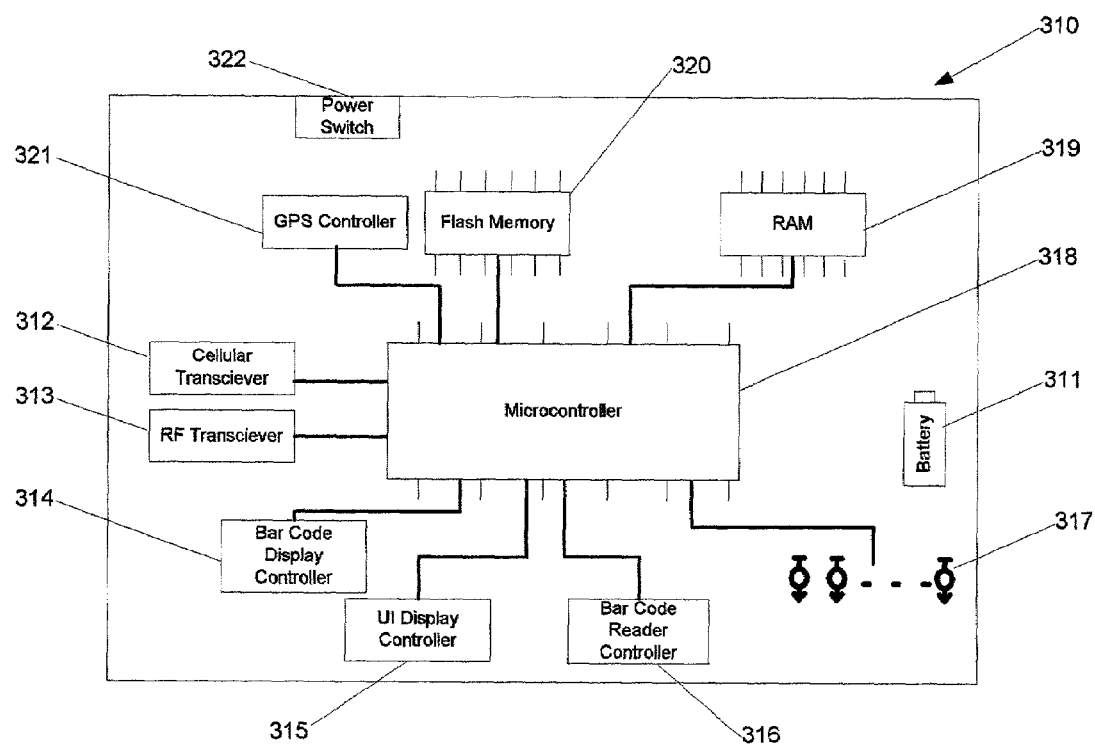
FIG. 3a is simplified schematic representation of the internal circuitry of one embodiment of a PWD according to the invention.

With reference to FIG. 1a, in one preferred embodiment, a Personal Wireless Device (PWD) 110 according to the invention preferably comprises a hand-held unit having data acquisition means 120 and data communication means 312, 313 (shown in FIG. 3a). A PWD used in retail establishments is, for example, the Symbol Technologies' Portable Shopping System™ produced by Symbol Technologies, Inc., Holtsville, N.Y. Examples of other portable scanners are shown by U.S. Pat. Nos. 5,107,100, and 5,149,950 which are hereby incorporated herein by reference.

The PWD 110 preferably comprises at least a bar code reader 120 that is capable of acquiring data from machine readable codes such as Universal Product Code (UPC) bar codes, one dimensional bar codes, two dimensional bar codes, reduced space symbology, composite symbology, and other similarly machine-readable encoded information. The PWD also preferably comprises one or more buttons 130 that are selectively actuatable by a user. The buttons 130 derive their functionality based on the current mode of operation of the PWD such that, for example, a given button 130 will have one function when the PWD is in "product scanning mode" and a different function when the PWD is in "incentive redemption mode". Power to the PWD can be toggled through the power switch 150.

The PWD 110 also preferably comprises a display means 140 that can be used to display textual and/or graphical information to the user. In a preferred embodiment, the display means 140 comprises a liquid crystal display. However, other display means such as, for example, an active matrix display or plasma display can be used. In one preferred embodiment, the display means 140 comprises a liquid crystal display that is capable of dynamically rendering bar codes similar to those presently found on many printed discount coupons. Bone, Jr., U.S. Pat. No. 6,082,620, for "Liquid Crystal Dynamic Barcode Display" is hereby incorporated herein by reference for its teachings relative to liquid crystal dynamic bar code displays that can be read by existing POS system laser scanners.

FIG. 3a illustrates, in a simplified manner and in accordance with one aspect of the present invention, the internal circuitry for the PWD 110 of FIG. 1a. In this preferred embodiment, a battery 311, which is preferably rechargeable, provides power to the PWD controller 310. A microcontroller 318 executes executable code stored in flash memory 320 and employs random access memory 319 for the execution.

A PWD, according to the invention as noted, also comprises data communication means via a cellular transceiver 312 and a Radio Frequency (RF) transceiver 313. The data communication means preferably effects bidirectional communication with a processing application 430 via cellular wireless protocols and/or RF communication protocols which are readily known to those having skill in the art. The communication link between the processing application 430 and the PWD 410 (shown in FIG. 4a) can be constant, but is more preferably accomplished in data bursts or packets that are transmitted and/or received by the PWD and processing application 430 at defined intervals of time and/or in response to user-actuated inputs. Preferably, the communication to and from the processing application 430 is accomplished under the control of the microcontroller 318.

Actuation of the buttons 130 (shown in FIG. 1a) on the PWD by the user toggles one or more dynamic user interface switches 317 which permit the user to send varying information to the microcontroller 318 depending upon the functional mode of the PWD. The buttons 130 also permit the user to input responses to prompts, such as incentive offers and other information conveyed to the user via the display 140, which is driven by the user interface display controller 315. Buttons 130 and dynamic user interface switches 317 are not necessary if the display comprises a touch screen or other active display means. Preferably, the dynamic bar code display screen is controlled by a bar code display controller 314. In one embodiment, the user interface display controller 315 and the bar code display controller 314 may be implemented on a single chip. The acquisition of data from product UPC bar codes via the bar code reader 120 (shown in FIG. 1a) is accomplished under control of microcontroller 318 via the bar code reader controller 316. Additionally, a power switch 322 that is toggled by power button 150 (shown in FIG. 1) permits the user to power off the PWD when not in use to conserve the life of the battery 311.

In one embodiment of the invention, the determination of the location of the PWD, and thus the identity of the store in which the PWD is being used, can be determined via a Global Positioning System (GPS) controller 321, which is under control of microcontroller 318.

Figure 4A:
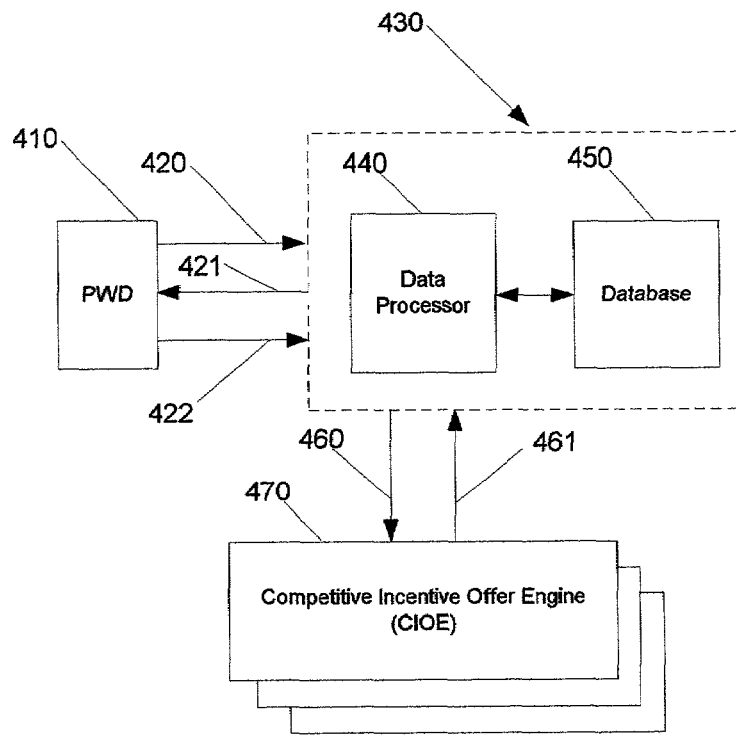
FIG. 4a is a schematic representation of one embodiment of a communications function of the system and method according to the invention.

With reference to FIG. 4a, the PWD 410 communicates with the processing application 430 via wireless communication interfaces 420, 421, and 422 using cellular wireless protocols and/or RF communication protocols which are readily known to those having skill in the art. The processing application 430 preferably comprises at least one database 450 and at least one data processor 440. The supplier Competitive Incentive Offer Engine (CIOE) 470 is whatever system or application the supplier uses to receive data from the processing application 430 and return an incentive to the user. The communications interfaces 460 and 461 can be via Local Area Network, Wide Area Network, Internet, online network, direct modem, wireless communication, or any other communications interface required by the supplier to facilitate the transfer of data between the processing application 430 and the supplier CIOE 470.

Figure 4B:
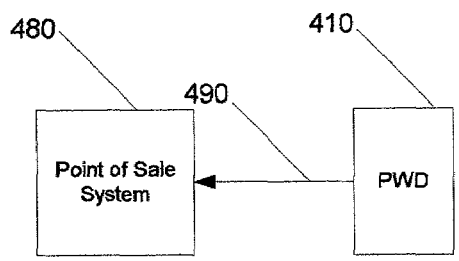
FIG. 4b is a schematic representation of another embodiment of a communications function of the system and method according to the invention.

With reference to FIG. 4b, the PWD 410 communicates with the Point of Sale system 480 via the bar code communications interface 490.

DESCRIPTION

FIGS. 1b, 2, 3b, 4c—Additional Embodiments

The data acquisition means of the PWD 110 may comprise a magnetic strip card reader, a data port, voice recognition device, and/or an optical scanner. Alternatively, but less preferred, the PWD 110 can include a printer that prints textual and/or graphical information on paper. It will be appreciated that buttons 130 may be completely unnecessary if the display means 140 comprises a touch sensitive display screen.

Figure 1B:
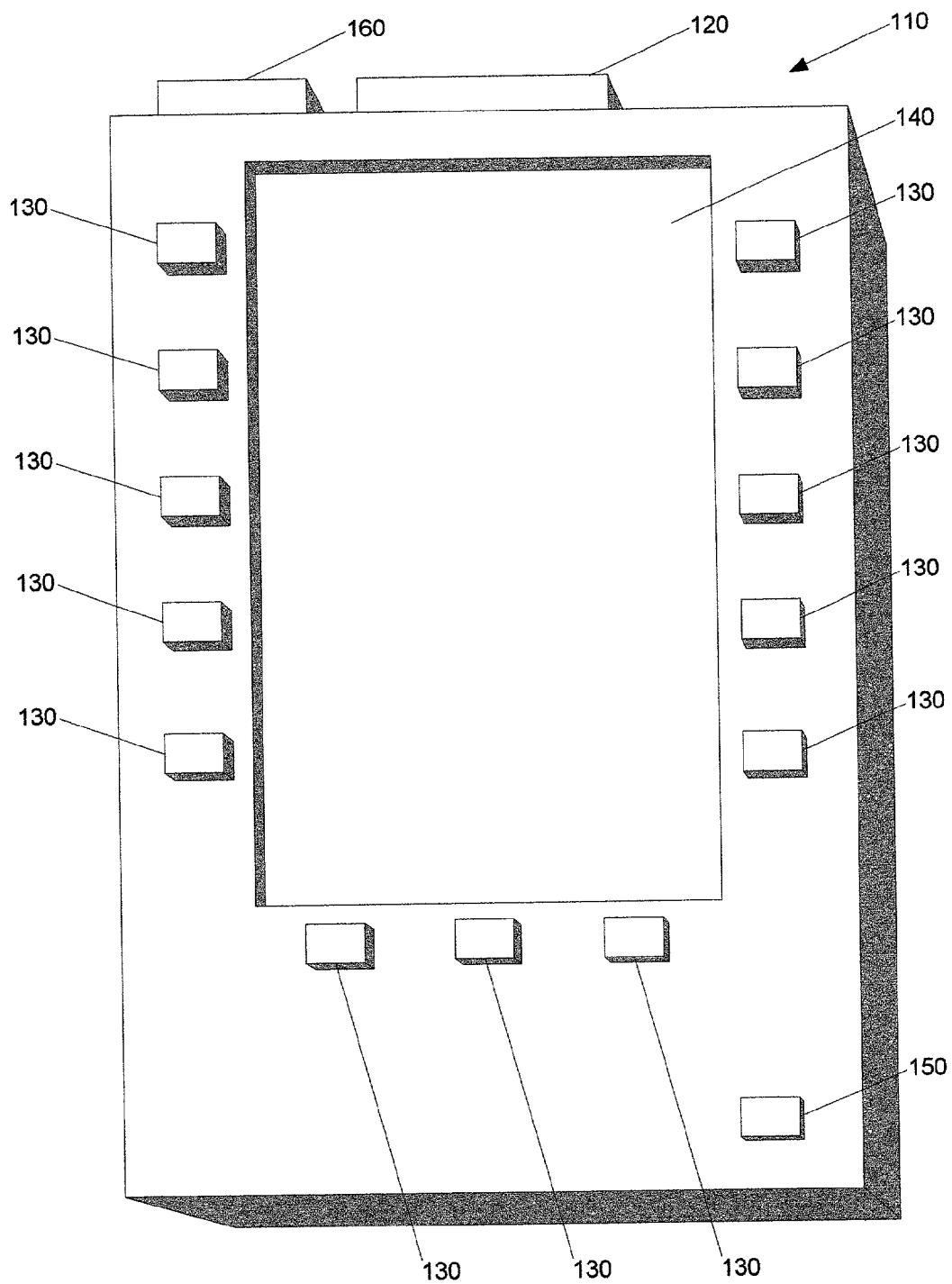
FIG. 1b is another perspective view of a personal wireless device according to the invention.
Figure 3B:
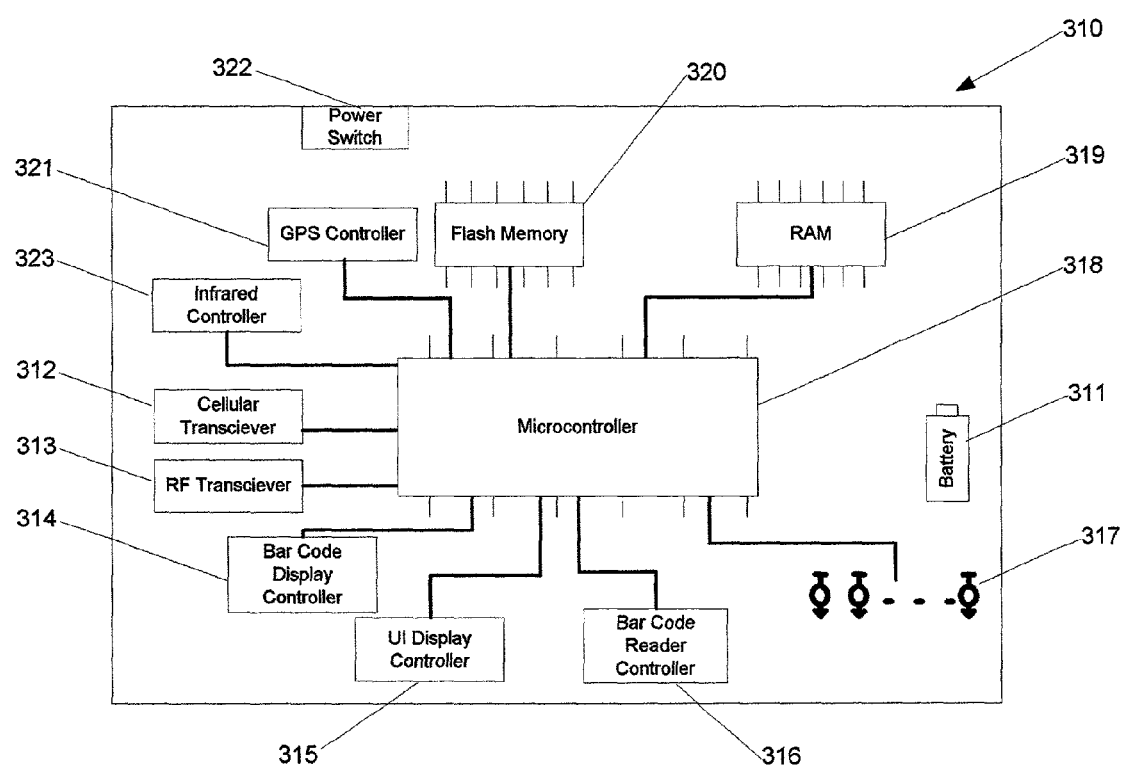
FIG. 3b is another simplified schematic representation of the internal circuitry of one embodiment of a PWD according to the invention.

As shown in FIG. 1b, the PWD 110 can further comprise an infrared transceiver 160 that is controlled by the infrared controller 323 as noted in FIG. 3b. The rest of the embodiment illustrated in FIG. 1b proceeds as in FIG. 1a, and the rest of the embodiment illustrated in FIG. 3b proceeds as in FIG. 3a.

Figure 2:
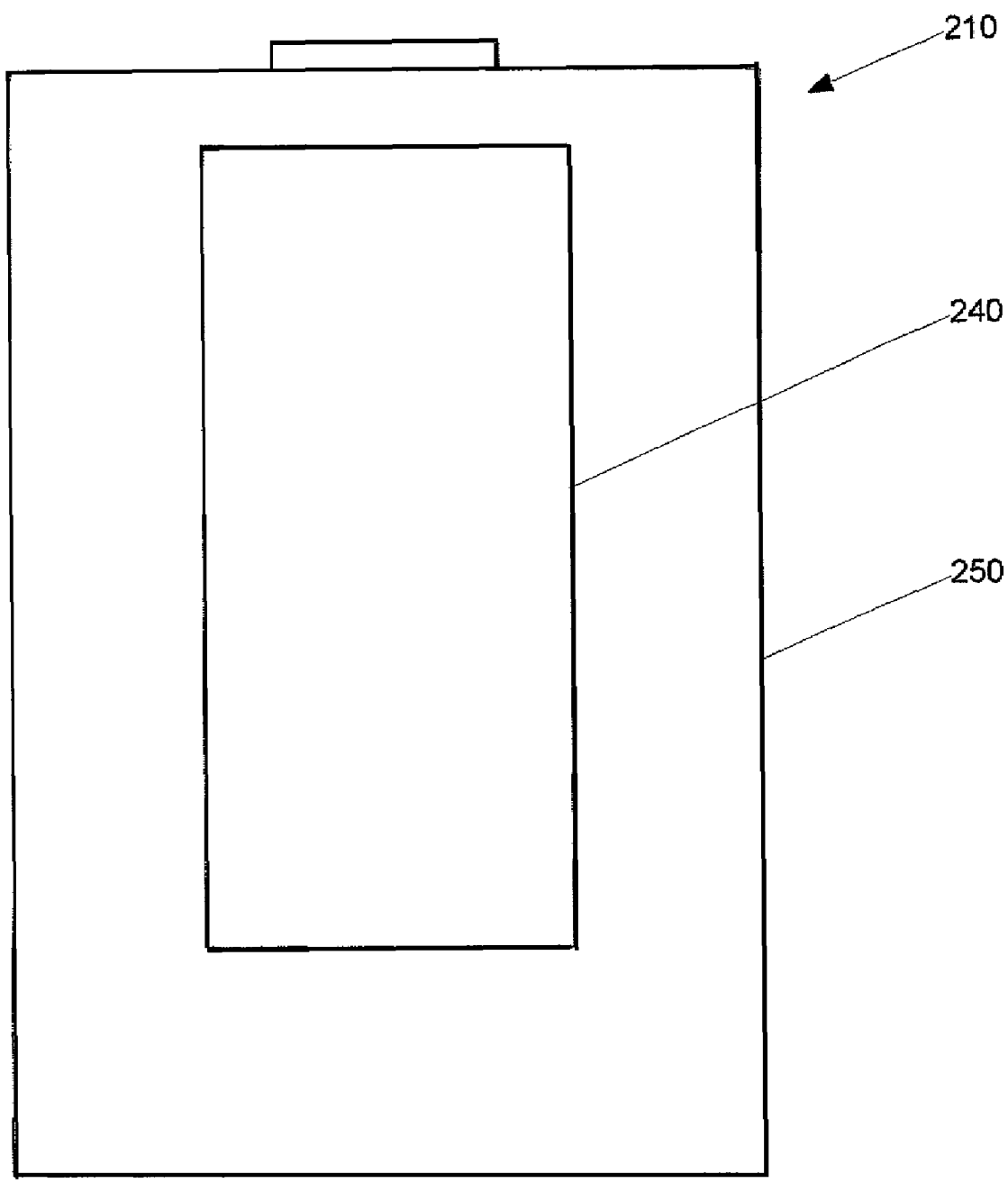
FIG. 2 is a schematic rear view of another embodiment of a personal wireless device according to the invention.

Additionally, as shown in FIG. 2, PWD 210 can further comprise a second specialized liquid crystal display means 240 disposed on a rear portion 250 of the unit for dynamically rendering UPC bar codes to be read by a POS checkout laser scanner. However, other bar code display means such as, for example, an active matrix display and/or a plasma display can be used. In other embodiments, display means 240 may be located on another face of the PWD 210 such as, for example, the bottom edge or a side.

Figure 4C:
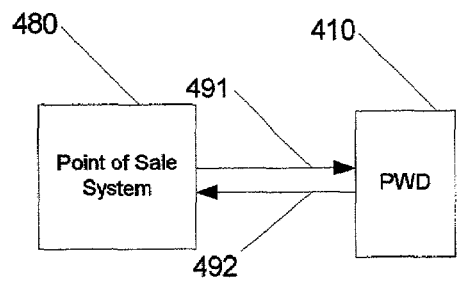
FIG. 4c is a schematic representation of yet another embodiment of a communications function of the system and method according to the invention.

With reference to FIG. 4c, the PWD 410, in another embodiment, communicates with the Point of Sale system 480 via wireless communication interfaces 491 and 492 using radio frequency communication protocols or infrared communications all of which are readily known to those having skill in the art. In this embodiment the PWD is able to establish bidirectional communications with the POS system and can perform automatic incentive validation against the products purchased by confirming that the incentive requirements of product purchase have been met before redeeming the incentive.

ADVANTAGES

The advantages provided by the system and method, according to the present invention, are numerous for both consumers and suppliers. Consumers will find the system and method very simple to use. Consumers need not be familiar with a computer or other intimidating technologies in order to obtain the benefits of the system and method, but must merely be capable of scanning a Universal Product Code (UPC) bar code and accepting or declining an incentive offered to them on the display of their Personal Wireless Device (PWD). Consumers no longer have to search for printed discount coupons in newspaper inserts, or waste time sifting through mass mailings looking for coupons of interest to them. Consumers no longer have to collate, store, and manage printed coupons, risk losing, misplacing or forgetting to use them, or fumble with them at the checkout line. Consumers who previously found it embarrassing to use discount coupons will likely be willing to use the system and method according to the invention because such systems provide more privacy to users, and there is no established negative stigma attached to its use. Consumers are able to instantly compare price incentives from one or more suppliers at the time of purchase, thereby optimizing their opportunities to obtain discounts.

The advantages to suppliers are also numerous and significant. Suppliers are able to forego the expense of producing, printing, distributing, and managing the redemption of printed discount coupons. Suppliers are able to offer specially tailored incentives to individuals in known demographics, maximizing their ability to influence shopper purchasing decisions and increase market share while simultaneously minimizing incentive expenses. Suppliers are able to use incentives to effectively reduce overstocks or inventories of goods approaching expiration dates. Moreover, because the system and method according to the invention operates with existing technologies, sellers with UPC bar code scanner enabled Point of Sale (POS) systems will not be required to upgrade or install new hardware to support the system and method. The present invention does not involve the use of printed discount coupons and thereby avoids the costs, time, and inconvenience associated with the physical management of printed discount coupons.

Suppliers are given an unprecedented opportunity to reach shoppers who are in the process of making decisions regarding which products to buy. The system and method according to the invention give suppliers one last critical chance to attempt to steal a customer from a competitor or to defend a customer of their own using price incentives and other offers instantly conveyed to the shopper. These advantages have not been realized in existing solutions.

It will be appreciated that the system and method of the present invention can include other useful functionality. For example, the PWD may display a running total of the purchases made by the shopper as they shop. The PWD may include a calculator permitting shoppers to make mathematical computations while shopping. The PWD may include English/metric conversion functionality, allowing shoppers to make better comparisons. The PWD may include additional GPS functionality that identifies when a user is near a particular store and then alerts the user of that fact and sends the user an incentive to enter the store. The PWD may also provide product information, nutritional information, recipes, and other information to users. The additional functionality such as, for example, gift registries, shopping lists, store recommendations, and web site integrated management, makes the system and method according to the invention far more powerful and generally user friendly.

The system and method according to the invention facilitate the implementation of government assistance programs such as, for example, food stamps and Special Supplemental Food Program For Women, Infants and Children, both of which are presently administered by the Social Security Administration. Instead of issuing food stamps or other printed vouchers, the SSA and/or other government agencies can supply data to the processing application via one or more databases. The data can specify the amount and particular uses for which assistance can be used by a particular recipient. A recipient of government assistance can use the PWD to purchase qualifying items, and can use the PWD to easily determine whether a particular product qualifies for coverage under the program. Use of the system and method of the present invention for this purpose can increase the speed with which benefits are provided to recipients, reduce program costs, prevent fraud and mistake, and otherwise make the assistance programs operate more efficiently.

While the invention has been shown and described with respect to certain embodiments thereof, this is intended for the purpose of illustration rather than limitation and other variations and modifications of the specific apparatus herein shown and described will be readily apparent to those having skill in the art.

OPERATION—FIGS. 1a, 4a, 5a-10

The present invention provides a dynamic time-of-purchasing-decision incentive system and method whereby a wireless device communicates a customized incentive to a shopper at the precise moment in time when the purchasing decision is being made. The system preferably comprises a Personal Wireless Device (PWD) 110 (shown in FIG. 1a) having data acquisition means and data communication means and a processing application.

With reference to FIG. 4a, the processing application 430 evaluates data received from the PWD 410 and then transmits incentives or other appropriate information to the PWD 410 to be displayed and/or communicated to the user using bidirectional communication, preferably using Radio Frequency (RF) and/or cellular and/or other wireless protocols as noted by 420, 421, and 422. The use of wireless means of communication permits the PWD to optionally further incorporate other known wireless communication and/or information technologies including, but not limited to, pagers, cellular telephones, Global Positioning System (GPS), and Personal Digital Assistants (PDAs), all of which are well known.

Figure 5A:
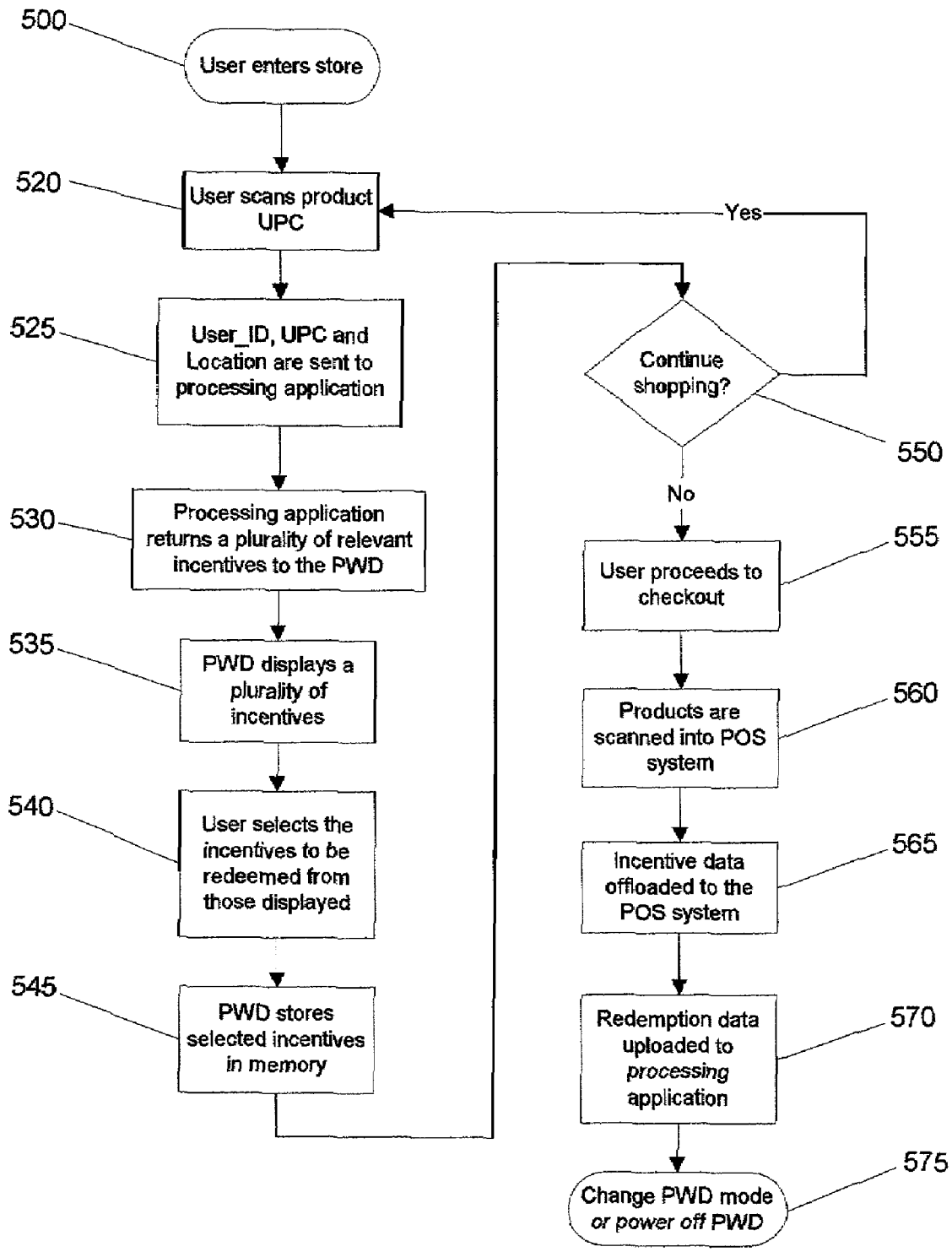
FIG. 5a is a flow chart of one embodiment of the method according to the invention.

The preferred operation of the system and method of the present invention may be understood with reference to FIG. 5a, which is a flow chart showing the method logic of one embodiment of the invention solely from the perspective of the PWD and the user. For ease of illustration only, it will be assumed that the PWD is being used by a shopper who is making purchasing decisions in a grocery store. However, it will be appreciated that the system and method according to the present invention is operable in installations other than grocery stores.

In the embodiment illustrated in FIG. 5a, a user first enters the grocery store, as indicated in step 500. In this embodiment, because the PWD is owned or leased to the user, the identity of the user can be readily identified on this basis alone. In a less preferred embodiment, the PWD may be provided by a grocery store in which case the PWD preferably includes user identification acquisition functionality, such as a consumer bar code identification reader, magnetic strip reader or a display and/or buttons for inputting such information.

Once in the grocery store, the shopper begins the process of shopping. The shopper selects a product for purchase. The shopper scans the Universal Product Code (UPC) bar code on the product using the UPC bar code scanner on the PWD, as indicated in step 520. The PWD assembles a digital message packet minimally containing data such as the shopper's unique identification number, the UPC bar code of the scanned product, optionally location information from a Global Positioning System (GPS), optionally the store's unique identification number, and other data, and communicates the data to the processing application, as indicated in step 525. The processing application processes the data received from the PWD along with data stored in one or more databases as described by the methods illustrated in FIG. 6a and FIG. 6b. If there are any incentives offered by the suppliers then the processing application communicates them in step 530 to the PWD.

The incentives communicated to the PWD may come in one or several different forms and are limited only by the ingenuity of the suppliers. For example, the incentive may be a price discount on the particular product the shopper scanned using the PWD, or it may be a price discount on another brand of the same product type (e.g., Brand A potato chips scanned, price discount offered on Brand B potato chips). The incentive may be for products related to the product scanned (e.g., soup can scanned, price discount offered for oyster crackers). Alternatively, the incentive may be an offer to purchase the product scanned, or a similar or related product from a different seller (e.g., book scanned, incentive offered is same book at reduced price from an Internet-based retailer). Because the user's identity and a means of payment are known through the user's monthly subscription to the wireless service, it is possible to complete transactions using the PWD. The PWD can display a multitude of incentives to the shopper in real time at the exact moment the shopper is making a purchasing decision. Preferably, the PWD includes functionality that permits the user to define a filter that limits the incentives/offers the user is willing to receive and have displayed for consideration.

Upon receiving the communication from the processing application, the PWD preferably alerts the shopper that one or more incentives are being offered on the particular product or on similar or related products indicated in step 535. The alert can be audible, visual, and/or tactile (e.g., vibration). Preferably, the user may control the type and amplitude of the alert.

Upon being alerted that an incentive is being offered for the product scanned and/or for another product, the user makes a purchasing decision. The user can input a response that selects the incentives to be redeemed from those displayed indicated in step 540. If an incentive was initially declined, optionally another incentive may be offered. If an incentive is accepted, the shopper inputs acceptance of the offer. The PWD then temporarily stores this information for later processing indicated in step 545. This process is repeated throughout the grocery store until the user has completed shopping indicated after step 550.

Once the shopper has completed shopping for items, the shopper proceeds to a Point of Sale (POS) checkout register indicated in step 555. The products selected by the shopper are scanned using existing technology, such as laser UPC bar code readers/scanners indicated in step 560. After the product UPC bar codes have been scanned, the PWD communicates the incentive information to the POS system indicated in step 565. Preferably, the PWD includes a display that is capable of dynamically rendering UPC bar codes that can be scanned using the existing POS system laser UPC bar code reader. Upon communicating the incentives to the POS system, the PWD communicates the incentives redeemed to the processing application so that appropriate updates to the database(s) can be made, as indicated in step 570. The shopper can change the PWD mode of operation or turn off the power to the PWD, as indicated in step 575.

Figure 5B:
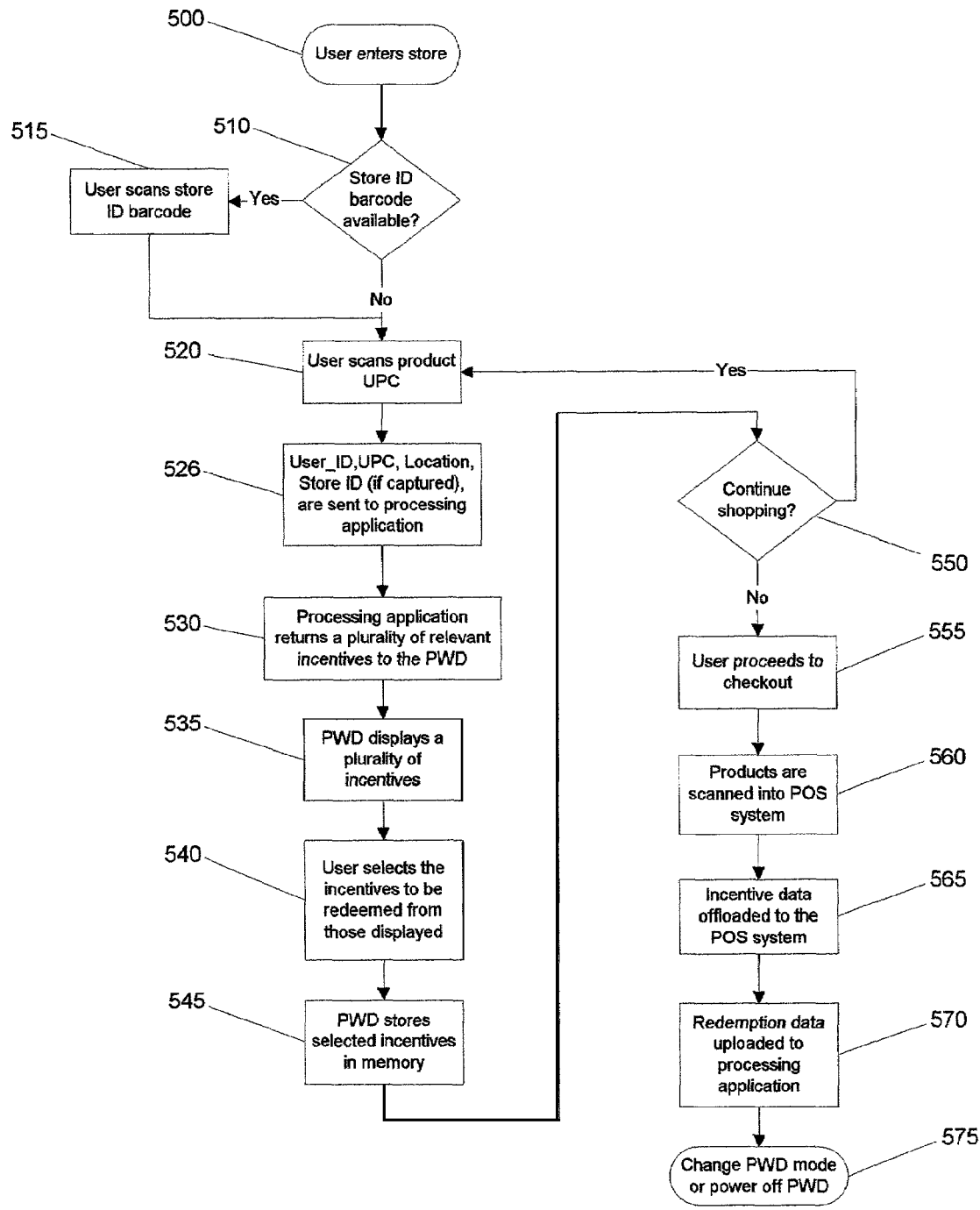
FIG. 5b is a flow chart of another embodiment of the method according to the invention.

The operation of the system and method of the present invention may be understood with reference to FIG. 5b, which is a flow chart showing the method logic of one embodiment of the invention solely from the perspective of the PWD and the user. For ease of illustration only, it will be assumed that the PWD is being used by a shopper who is making purchasing decisions in a grocery store. However, it will be appreciated that the system and method according to the present invention is operable in installations other than grocery stores.

In the embodiment illustrated in FIG. 5b, if a store identifying bar code is available at the entrance or on the store premises indicated, as in step 510, then the user scans it in with the PWD, as indicated in step 515. The PWD retains the store ID in memory 319 (as shown in FIG. 3) to be used as required in data messages transmitted to the processing application. The shopper scans the UPC bar code of the product using the PWD's scanner, as indicated in step 520. The PWD assembles a digital message packet containing data such as the shopper's unique user identification number, the UPC bar code of the scanned product, optional location information from a GPS, and communicates the data to the processing application indicated in step 526. The rest of the embodiment illustrated in FIG. 5b proceeds as in FIG. 5a.

Figure 6A:
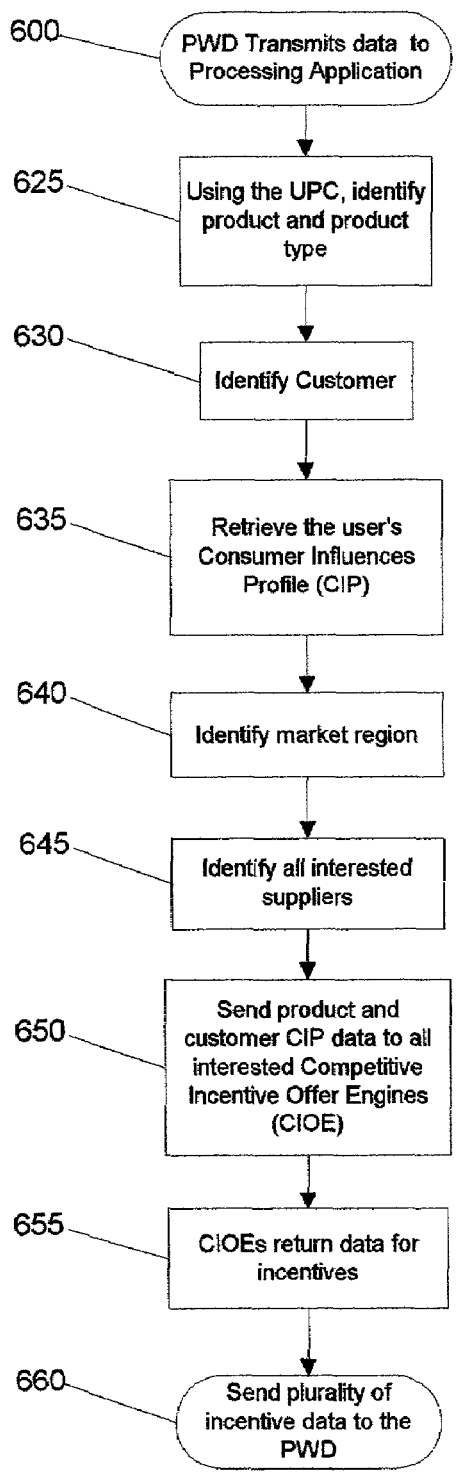
FIG. 6a is a flow chart of yet another embodiment of the method according to the invention.

FIG. 6a is a flow chart illustrating the logic of a computer implemented process which, in accordance with one embodiment of the present invention, facilitates the collection of incentives to be presented to a shopper based upon data acquired by the PWD and data stored in one or more databases.

In step 600, data acquired by the PWD is transmitted to and received by the processing application. The processing application processes the data transmitted by the PWD and, using data stored in one or more databases, identifies the product and product class that the shopper scanned, as indicated in step 625.

In step 630, the processing application further processes the data transmitted by the PWD and, using data stored in one or more databases, identifies the user of the PWD. In step 635, the processing application retrieves a Consumer Influence Profile (CIP) for the user from one or more databases. U.S. Pat. No. 6,327,574 of Kramer, et al. Issued Dec. 4, 2001, for "Hierarchical models of consumer attributes for targeting content in a privacy-preserving manner" is hereby incorporated herein by reference for its teachings relative to creating a consumer Influence profile. Preferably the CIP contains past purchasing history and/or metrics that reflect the effectiveness of certain incentives for that particular user in relation to the specific product being considered, the general class of product being considered, and/or all products in general. Additionally the CIP may optionally contain demographic information about the user such as age, gender, etc. Accordingly, stored data relating to determining an incentive is comprised of a combination of past shopping history of the shopper, a plurality of first products scanned within a product category, a plurality of products purchased with incentives, and/or a plurality of incentives redeemed.

The market region can be identified, indicated in step 640, by a number of different methods. For example, if the store ID is available then the market region is readily known based upon the location of the store. In another embodiment the GPS functionality of the PWD can be used. In further embodiments, the market region can be established by referencing the location of the primary local cellular or RF communications tower being used. In yet another possible embodiment, the local address that is on file for the user may be used.

Once the known market region is combined with other data such as the UPC code of the product scanned, the processing application can establish the identity of all interested suppliers, as indicated in step 645. In step 650 the CIP and product information is presented to the Competitive Incentive Offer Engine (CIOE) of each interested seller and supplier. Each CIOE comprises a computer application that is provided by subscribing suppliers to process the inputs and to calculate the optimal incentive to provide to that shopper. In step 655, all incentives are sent back from each CIOE to the processing application. A plurality of incentives are then transmitted to the user's PWD for consideration by the user, as indicated in step 660.

Figure 6B:
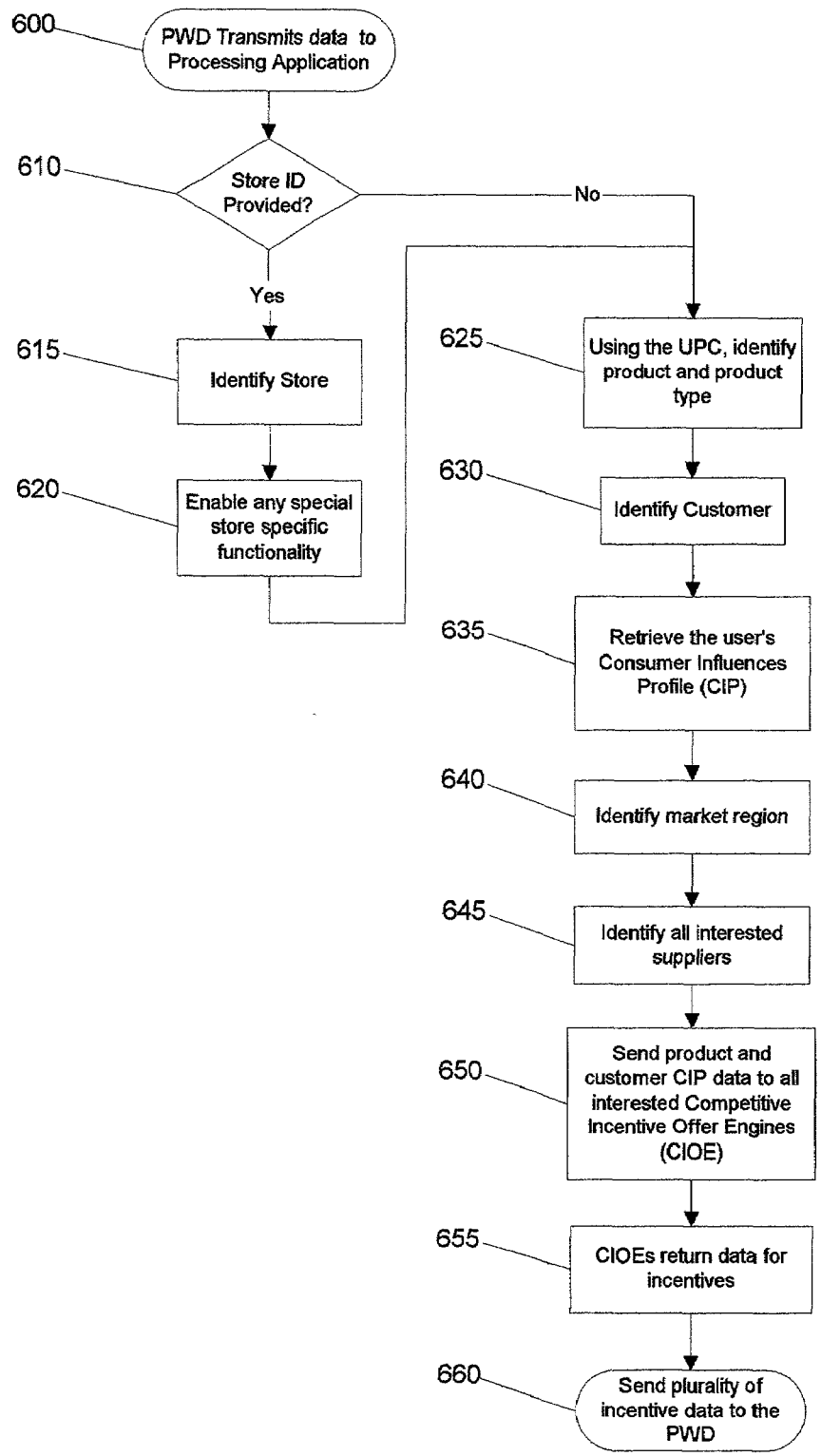
FIG. 6b is a flow chart of yet another varying embodiment of the method according to the invention.

FIG. 6b is a flow chart illustrating the logic of a computer implemented process which, in accordance with one embodiment of the present invention, facilitates the collection of incentives to be presented to a shopper based upon data acquired by the PWD and data stored in one or more databases.

If the store ID has been provided, as indicated in step 610, then the processing application looks up the store in the database, indicated in step 615, and enables any special functionality associated with the store indicated in step 620. Additional functionality may include, for example, enhanced incentives, store brand product incentives, contests, etc. The rest of the embodiment illustrated in FIG. 6b proceeds as in FIG. 6a.

Figure 7A:
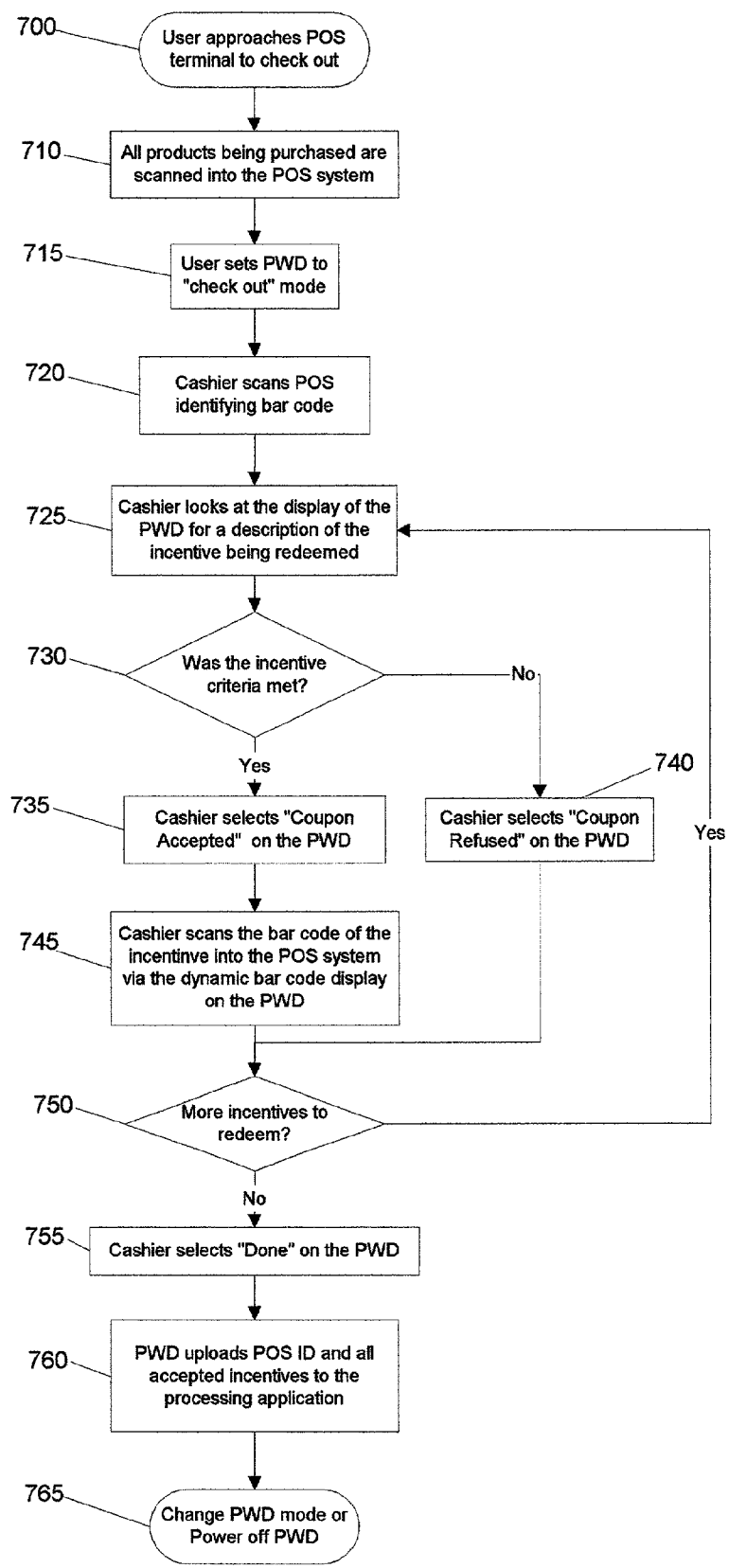
FIG. 7a is a flow chart of yet another embodiment of the method according to the invention.

FIG. 7a is a flow chart illustrating the logic of a computer implemented process which, in accordance with one embodiment of the present invention, facilitates the checkout process using the dynamically rendered bar code display 240 (as shown in FIG. 2).

In step 700 the user approaches the POS terminal to complete the shopping process and checkout. As normal, all products being purchased are scanned into the POS systems, as indicated in step 710. The user then sets the PWD into "checkout" mode indicated in step 715. Either the user or the cashier uses the PWD to scan in a bar code located on or near the POS terminal that uniquely identifies the store and the POS register, as indicated in step 720. The PWD displays the first incentive that the consumer has selected to redeem. The cashier looks at the description of the incentive being displayed and confirms that the incentive criteria have been met, as indicated in step 725. If the incentive criteria have been met, as indicated in step 730, then the cashier selects the button on the PWD to indicate that the incentive has been accepted, as indicated in step 735. The cashier then passes the dynamic bar code display of the PWD over the POS bar code scanner to register the incentive with the POS system, as indicated in step 745. However, if the incentive criteria have not been met then the cashier selects the button on the PWD to indicate that the incentive has been refused indicated in step 740. It will be appreciated that if the POS system supports automatic incentive validation, which accepts or rejects incentives based upon the products purchased, that the cashier may scan in the incentives from the PWD and indicate acceptance or rejection on the PWD based upon the feedback from the POS system. In step 750, if there are more incentives to be redeemed then the cashier will be presented with each incentive and can repeat the process beginning at step 725. Once all incentives have been accepted or rejected, the cashier selects "Done" on the PWD, as indicated in step 755. The PWD then uploads all accepted incentives to the processing application, as indicated in step 760. The device is then returned to the shopper who can then change the PWD mode of operation or turn off the power to the PWD indicated in step 765.

Figure 7B:
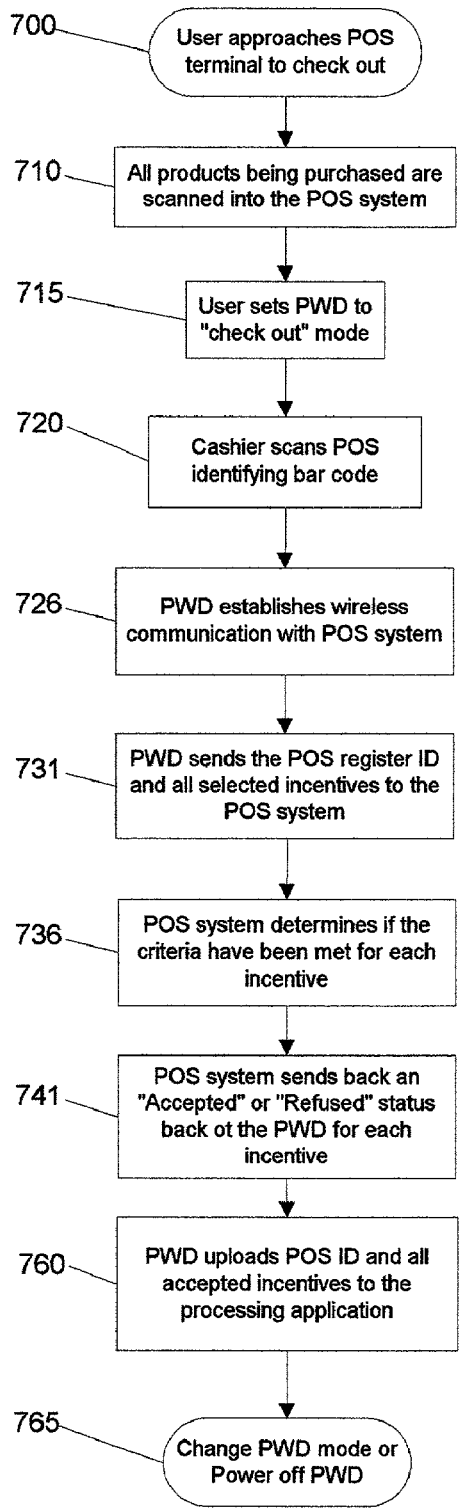
FIG. 7b is a flow chart of yet another varying embodiment of the method according to the invention.

FIG. 7b is a flow chart illustrating alternative logic of a computer implemented process which, in accordance with another embodiment of the present invention, facilitates the checkout process using an enhanced POS system that supports wireless bidirectional communication.

In step 700 the user approaches the POS terminal to complete the shopping process and checkout. Per a normal shopping scenario, all products being purchased are scanned into the POS systems indicated in step 710. The user then sets the PWD into "checkout" mode indicated in step 715. Either the user or the cashier uses the PWD to scan in a bar code that uniquely identifies the store and the POS register which is located on or near the POS terminal indicated in step 720. The PWD then establishes wireless communication with the POS system indicated in step 726 via RF, infrared or another wireless protocol readily appreciable to those skilled in the art. The PWD then sends the POS register ID and all selected incentives to the POS system indicated in step 731. The POS register ID is provided to positively link the incentive data being provided to the specific purchases being made in the event that multiple POS registers are in receptive proximity to the PWD wireless communication. The POS system then compares the incentives against the products purchased and determines if the incentive criteria have been met and if each incentive is to be accepted or refused, as indicated in step 736. The POS system then wirelessly transmits back the accepted or refused status for each incentive to the PWD, as indicated in step 741, and the PWD uploads the data for all accepted incentives to the processing application, as indicated in step 760. The device is then returned to the shopper who can then change the PWD mode of operation or turn off the power to the PWD indicated in step 765. It will be appreciated that the wireless communication indicated in FIG. 7*b* may, in another embodiment, be replaced with a physical connection where the PWD is placed into a cradle or similar housing attached to the POS terminal which enables the communication with the POS system through conductive contacts or other physical means readily appreciable to those skilled in the art.

Figure 8:
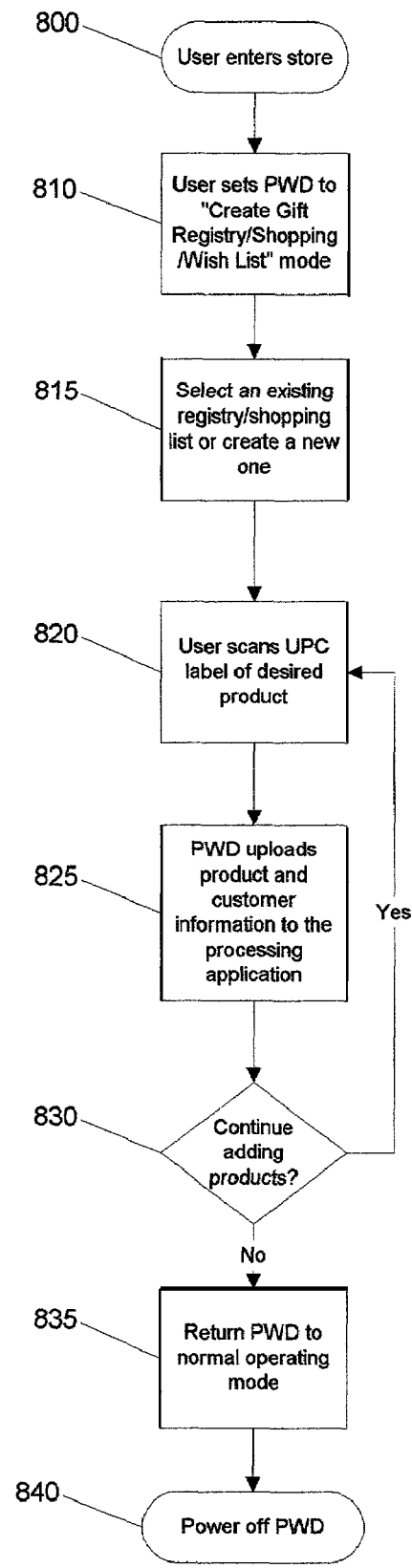
FIG. 8 is a flow chart of yet another aspect of the method according to the invention.

Another use of the system and method according to the invention is illustrated with reference to FIG. 8, which is a flowchart illustrating the steps used to create a personal gift registry/shopping/wish list employing the system and method according to the invention.

In step 800, a user enters a store to begin the process. In step 810, the user sets the PWD to gift registry/shopping list mode. In step 815, the user inputs, in response to prompts displayed on the PWD, whether the products are to be added to an existing list or a new list. In step 820, the user scans the UPC bar code of a product the user wishes to add to the list using the UPC bar code reader functionality of the PWD. As noted in step 825, the PWD assembles a digital data message packet containing data such as the product UPC bar code, the unique user identification number, and the unique shopping list ID or Gift Registry Identification Number (GRID), and communicates said data message packet to the processing application. In step 830, the user decides to continue adding products to the list or not. If the user decides to continue adding products to the list, then the process resumes at step 820. If the user chooses not to add more products to the list, the process proceeds to step 835, where the user sets the PWD back to normal operating mode. The process flowchart terminates at step 840, when the user changes the PWD mode of operation or turns off power to the PWD.

Figure 9:
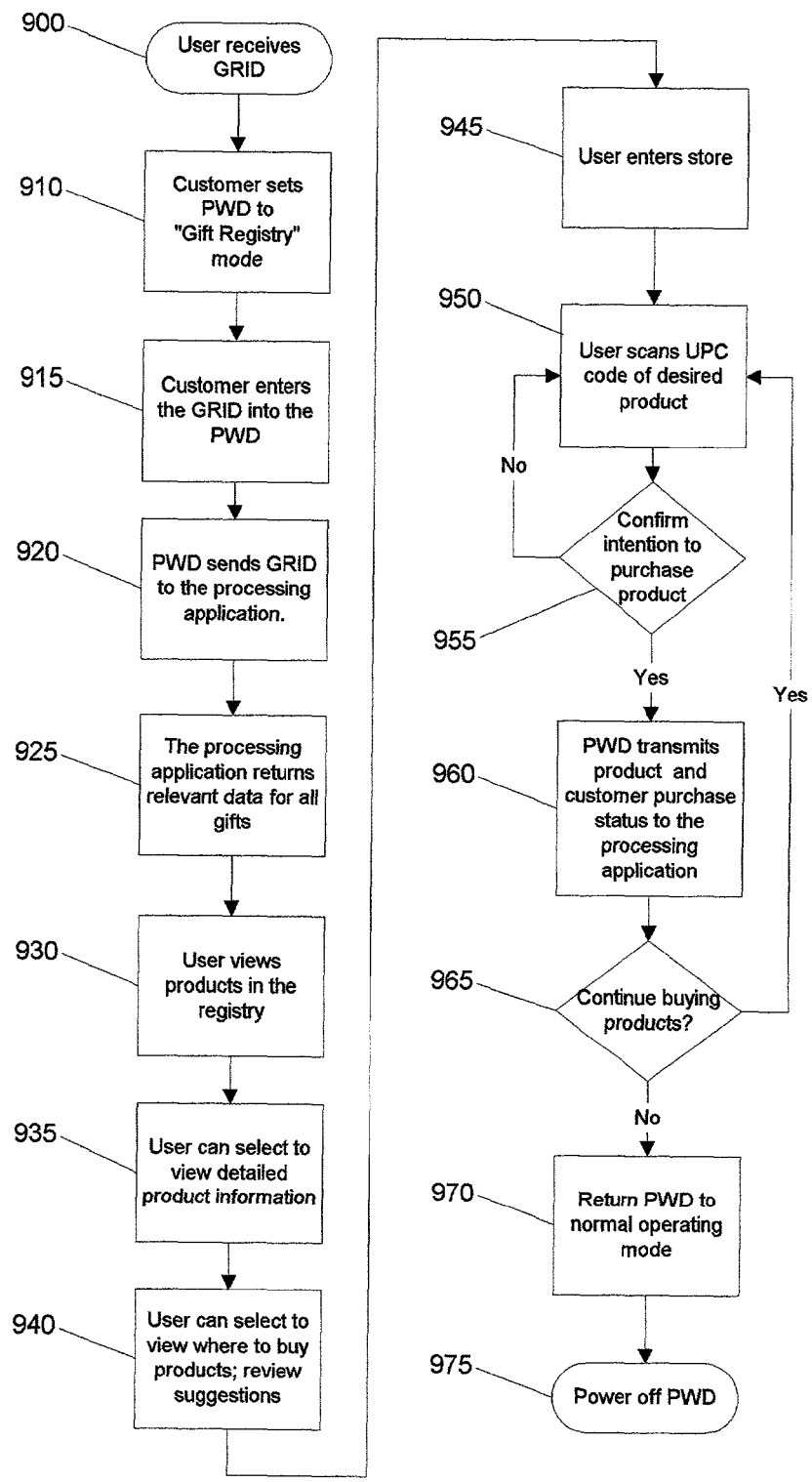
FIG. 9 is a flow chart of another embodiment of the method according to the invention.

FIG. 9 is a flow chart illustrating, in accordance with aspects of the present invention, the purchasing process that utilizes a personal gift registry/shopping/wish list created in accordance with the process illustrated with reference to FIG. 8.

In step 900, a user receives the gift recipient's unique GRID number. In step 910, the user sets the PWD to purchase from a gift registry mode. In step 915, the user enters the GRID into the PWD. In step 920, a data packet containing the GRID and other optional data is transmitted by the PWD to the processing application. The processing application retrieves the gift recipient's list from the database and communicates a data message to the PWD containing a collection of products, summary descriptions, current purchase status and other data that is necessary, as indicated in step 925. In step 930, the user uses the PWD to view the product information that was received from the processing application in step 925. In step 935, the user can use the PWD to obtain more detailed information regarding the products on the list, as indicated in step 940, including information regarding the identities and locations of sellers who have the product(s) for sale. In step 945, the user enters a store that sells a product on the list. In step 950, the user scans the UPC bar code of the product to purchase from the gift recipient's list. After confirming the intention to purchase the product in step 955, the PWD transmits data such as, for example, the product information, the user identification number, and the GRID to the processing application. If the user desires to continue purchasing products from the list, the process resumes at step 950. If, however, the user chooses not to purchase more products from the list, the process proceeds to step 970, where the user sets the PWD back to normal operating mode. The process ends at step 975, when the user turns off power to the PWD.

Figure 10:
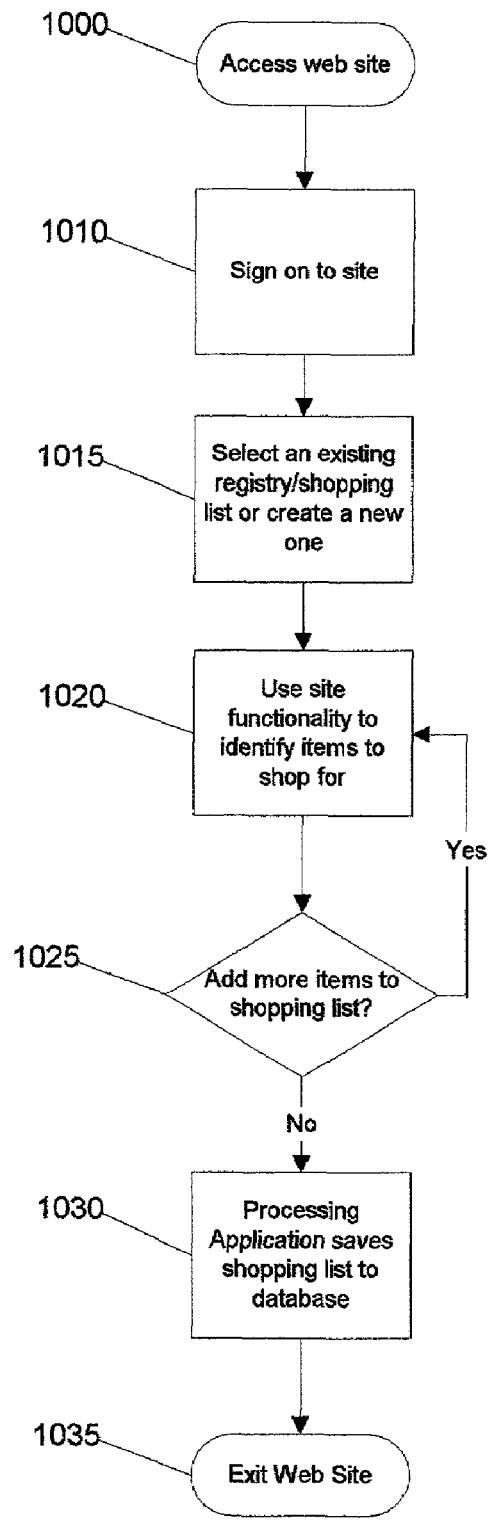
FIG. 10 is a flow chart of yet another embodiment of the method according to the invention.

FIG. 10 is a flow chart illustrating, in accordance with another aspect of the present invention, a web site driven gift registry/shopping/wish list creation process that utilizes the Internet.

In step 1000, the user accesses an Internet web site that has computer interfaces with processing application. In step 1010, the user signs onto the web site using a user ID, password, or other means of secure identification validation that is readily appreciable to those having skill in the art. In step 1015, the user selects whether the products are being added to an existing list or are being added to a new list. In step 1020, the user uses the site functionality to identify products that they are interested in purchasing/receiving and adds these items to a list. With the capabilities of the web interface, other options may be introduced to the list creation process such as reorder frequency, which would add a selected item back to the list after a specified time interval or other triggering event. In step 1025, if the user decides to continue adding products to the list the process continues from step 1020. If the user does not wish to continue, the process moves to step 1030, where the selections are confirmed, transmitted to the processing application for storage in one or more databases. The process flowchart terminates at step 1035, when the user logs off the Internet web site.

CONCLUSION, RAMIFICATIONS, AND SCOPE

Thus, the reader will see that the current invention provides a unique method of delivering real-time, competitive, custom incentives to shoppers based upon a their past actions and current product information at the moment they are making a buying decision. Furthermore, the current invention provides an incentive delivery method that integrates with current art point of sale systems without the need for additional seller hardware investments while additionally eliminating seller's current need to handle cumbersome printed coupons.

Although the present invention and its advantages have been described in detail, it should be understood that various changes, substitutions, and alternatives can be made therein without departing from the spirit and scope of the present invention as defined by the appended claims. For example, an embodiment of the invention has been described in the context of reading UPC bar codes; however, it is explicitly contemplated that the teachings of the invention may be incorporated with other types of codes representative of products, including existing codes and codes yet to be developed. In another embodiment the PWD 110 can also comprise an audio speaker, vibrator, strobe or other light emitting means (e.g., LED), or other means of drawing the user's attention to the device. It is further appreciated that while the PWD 110 illustrated in FIG. 1*a*, and FIG. 1*b* is a hand-held unit, it will be appreciated that the PWD can be fixedly or removably mounted to any structure including, for example, a shopping cart.

In another embodiment, the components explicitly defined in FIG. 3 such as microcontroller 318, flash memory 320, random access memory 319, etc. may be integrated in any combination on a single chip. In yet another embodiment, the PWD 110 may additionally support cell phone, PDA, GPS and/or pager functionality.

Accordingly, the scope of the invention should be determined not by the embodiments illustrated, but by the appended claims and their legal equivalents.

We claim:

1. A system for delivering shopping incentives individually customized to influence each customer by using products currently being considered by the customer and the customer's past shopping behavior metrics to encourage the purchase of products having machine readable codes where said incentives are generated by a plurality of independently competing manufacturer controlled dynamic incentive offer engines each receiving data about the product being considered and the consumer's past shopping behavior metrics to enable the targeted customization of each incentive said engine will generate to meet the manufacturer's objectives, and where the incentives are presented to the customer at the time a purchase decision is being made, said system comprising:

a. a wireless device having a scanning means usable by the shopper to read machine readable codes;

b. a computer readable medium storing a processing application that accesses stored shopper data relating to determining a customer behavior customized shopping incentive for the shopper wherein said stored shopper data is comprised of demographic information and past shopping behavior metrics for each product class as derived from the item first scanned while shopping within the product class on a shopping trip, the product class incentives offered on said shopping trip, the product class incentives selected to be redeemed on said shopping trip, and the product class incentives declined on said shopping trip;

c. said wireless device having a first communication means for communicating the machine readable code and stored shopper data to said processing application;

d. one or more computer readable mediums storing a plurality of independently competing manufacturer controlled dynamic incentive offer engines having manufacturer controlled logic of a computer implemented process that creates a customized shopping incentive determined by combining the stored shopper data received from said processing application with the manufacturer's internal concerns including at least marketing budget and internal market share objectives;

e. said processing application having a second communication means for communicating said data relating to determining a customized shopping incentive to the plurality of incentive offer engines;

f. each of the plurality of incentive offer engines having a third communication means for communicating the customized shopping incentives to said processing application;

g. said processing application having a fourth communication means for communicating the customized shopping incentives to said wireless device;

h. said wireless device having a user interface usable by the shopper to select the incentives to be redeemed;

i. said wireless device having a fifth communication means for communicating said customized shopping incentives to be redeemed to a point of sale system; and j. said wireless device having a sixth communication means for communicating said customized shopping incentives to be redeemed to said processing application.

2. The system according to claim 1, wherein said scanning means comprises a bar code scanner and said machine readable codes are selected from the group consisting of universal product code bar codes, one dimensional bar codes, two dimensional bar codes, reduced space symbology, and composite symbology.

3. The system according to claim 1, wherein said first communication means, said fourth communication means, and said sixth communication means employ wireless communication methods as selected from the group consisting of cellular communications and radio frequency communications.

4. The system according to claim 1, wherein said second communication means, and said third communication means employ computer connections selected from the group consisting of local area network, wide area network, the internet, online network, direct modem, cellular communications and radio frequency communications.

5. The system according to claim 1, wherein said fifth communication means comprises a display that dynamically renders bar codes and is scannable by the (a) bar code reader of the point of sale system.

6. The system according to claim 1, wherein said fifth communication means comprises a wireless communication with the point of sale system employing short range wireless methods selected from the group consisting of radio frequency and infrared.

7. The system according to claim 1, wherein said wireless device further comprises global positioning system circuitry.

8. A method for delivering shopping incentives individually customized to influence each customer by using products currently being considered by the customer and the customer's past shopping behavior metrics to encourage the purchase of products having machine readable codes where said incentives are generated by a plurality of independently competing manufacturer controlled dynamic incentive offer engines each receiving data about the product being considered and the consumer's past shopping behavior metrics that enable the targeted customization of each incentive said engine will generate to meet the manufacturer's objectives, and where the incentives are presented to the customer at the time a purchase decision is being made, said method comprising the steps of:

a. providing a wireless device having a scanning means usable by the shopper;

b. reading a machine readable code by the wireless device;

c. providing a processing application accessing stored shopper data relating to determining a customer behavior customized shopping incentive for the shopper wherein said stored shopper data is comprised of demographic information and past shopping behavior metrics for each product class as derived from the item first scanned while shopping within the product class on a shopping trip, the product class incentives offered on said shopping trip, the product class incentives selected to be redeemed on said shopping trip, and the product class incentives declined on said shopping trip;

d. communicating the machine readable code and stored shopper data to said processing application from said wireless device;

e. evaluating said machine readable code and stored shopper data to determine a consumer influence profile by said processing application;

f. providing a plurality of independently competing manufacturer controlled dynamic incentive offer engines each having manufacturer controlled logic of a computer implemented process that creates a dynamically-customized shopping incentive determined by combining the consumer influence profile received from said processing application with the manufacturer's internal concerns including at least marketing budget and internal market share objectives;

g. communicating said consumer influence profile to said plurality of independently competing manufacturer controlled dynamic incentive offer engines from said processing application;

h. determining a dynamically-customized shopping incentive for said shopper by each of said independently competing manufacturer controlled dynamic incentive offer engines;
i. communicating said dynamically-customized shopping incentives to said processing application from said plurality of independently competing manufacturer controlled dynamic incentive offer engines;
j. communicating said dynamically-customized shopping incentives to said wireless device from said processing application;
k. selecting said dynamically-customized shopping incentives to be redeemed by the shopper;
l. communicating the selected dynamically-customized shopping incentives to be redeemed to a point of sale system from said wireless device; and
m. communicating the selected dynamically-customized shopping incentives to be redeemed to said processing application from said wireless device.

9. The method according to claim 8, wherein said step of communicating the machine readable code and stored shopper data to said processing application from said wireless device is performed by wireless communication means.

10. The method according to claim 8, wherein said step of communicating said stored shopper data including data that comprises a consumer influence profile to said plurality of independently competing manufacturer controlled dynamic incentive offer engines from said processing application is performed by the processing application connected to each of the incentive offer engines via a connection selected from the group consisting of local area network, wide area network, the internet, online network, direct modem, cellular communications and radio frequency communications.

11. The method according to claim 8, wherein said step of communicating said dynamicaliy-customized shopping incentives to said processing application from said plurality of independently competing manufacturer controlled dynamic incentive offer engines is performed by each of the competitive incentive offer engines connected to the processing application via a connection selected from the group consisting of local area network, wide area network, the internet, online network, direct modem, cellular communications and radio frequency communications.

12. The method according to claim 8, wherein said step of communicating said dynamically-customized shopping incentive to said wireless device from said processing application is performed by wireless communication means.

13. The method according to claim 8, wherein said step of communicating said selected dynamically-customized shopping incentive to a point of sale system from said wireless device is accomplished by dynamically rendering and displaying bar codes on the wireless device which are then read by the bar code scanner of the point of sale system.

14. The method according to claim 8, wherein said step of communicating said selected dynamically-customized shopping incentive to a point of sale system from said wireless device is accomplished with the point of sale system via wireless communication means.

15. The method according to claim 8, wherein said step of communicating said selected dynamically-customized shopping incentives to be redeemed to said processing application from said wireless device is accomplished with the processing application via wireless communication means.

* * * * *